(12) United States Patent
Smith

(10) Patent No.: US 7,228,594 B2
(45) Date of Patent: Jun. 12, 2007

(54) FLUID LEVITATING CASTER INTEGRATING LOAD LIFTING DEVICE

(76) Inventor: Jason L. Smith, 420 Strafford Ave. 3D, Wayne, PA (US) 19087

( * ) Notice: Subject to any disclaimer, the term of this patent is extended or adjusted under 35 U.S.C. 154(b) by 110 days.

(21) Appl. No.: 11/090,359

(22) Filed: Mar. 28, 2005

(65) Prior Publication Data

US 2006/0213028 A1    Sep. 28, 2006

(51) Int. Cl.
*B60B 33/00*    (2006.01)
*B60V 1/00*    (2006.01)

(52) U.S. Cl. .......................................... 16/42 R; 16/19
(58) Field of Classification Search ................ 16/18 R, 16/32, 33, 19, 30, 42 R, 42 T; 280/43; 180/116, 180/119, 121, 122, 129; 414/676
See application file for complete search history.

(56) References Cited

U.S. PATENT DOCUMENTS

| | | | | |
|---|---|---|---|---|
| 2,134,444 A * | 10/1938 | Harsh | ............................. | 16/19 |
| 3,096,991 A * | 7/1963 | Crankshaw | .............. | 280/43.24 |
| 3,225,380 A * | 12/1965 | Faul | ............................. | 16/32 |
| 3,390,736 A * | 7/1968 | Thomas | ...................... | 180/119 |
| 3,756,342 A | 9/1973 | Burdick | ...................... | 180/124 |
| 3,829,116 A * | 8/1974 | Burdick | ................... | 280/43.23 |
| 5,967,666 A * | 10/1999 | Johnson | ....................... | 384/12 |
| 6,533,121 B1* | 3/2003 | Ross | ........................ | 206/599 |
| 6,585,069 B1* | 7/2003 | Smith | ........................ | 180/116 |
| 6,695,084 B2* | 2/2004 | Wilk | ........................ | 180/117 |
| 2003/0028997 A1* | 2/2003 | Plate | ............................. | 16/48 |
| 2004/0111830 A1* | 6/2004 | Cooper et al. | ................. | 16/44 |

FOREIGN PATENT DOCUMENTS

DE    3519479 A1 * 12/1986

* cited by examiner

*Primary Examiner*—Robert J. Sandy
*Assistant Examiner*—Andre L. Jackson
(74) *Attorney, Agent, or Firm*—Paul Hentzel

(57) ABSTRACT

A fluid levitating caster lifts a heavy load "(17)" off a floor "(18)" with near friction-less-ness for transport has integrated a load lifting device. This extra rise height "(ER)" lifting feature accommodates moving loads "(17)" which have flexible-sagging frames, over uneven floors "(18)", and which have frames that are not parallel to floor "(18)". An inflatable bellows "(22)" design of the load lifting device receives its pressurization from fluid levitating caster, and additionally serves as a dampening reservoir to reduce hopping-pressure surges inherent in fluid levitating casters.

4 Claims, 4 Drawing Sheets

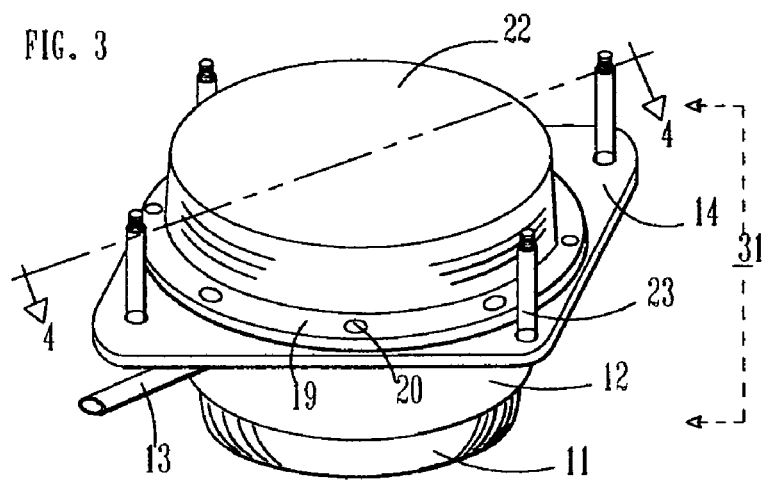
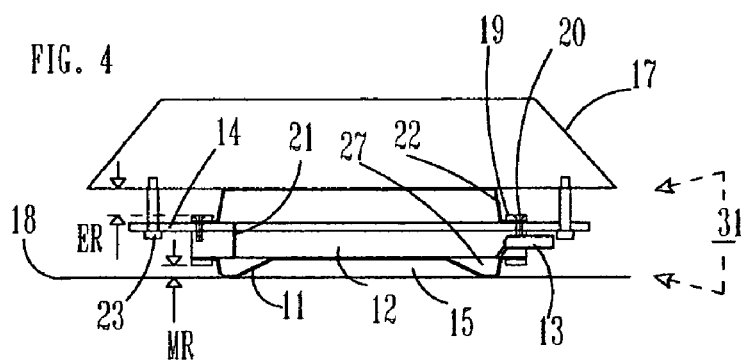
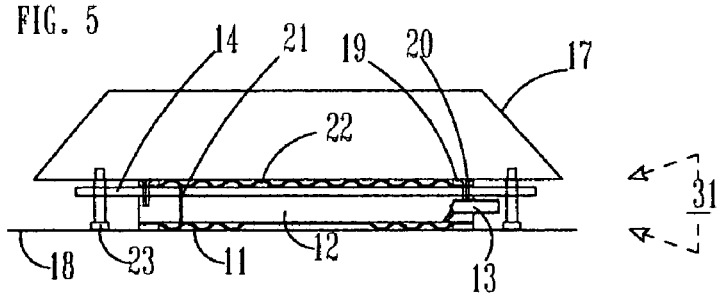
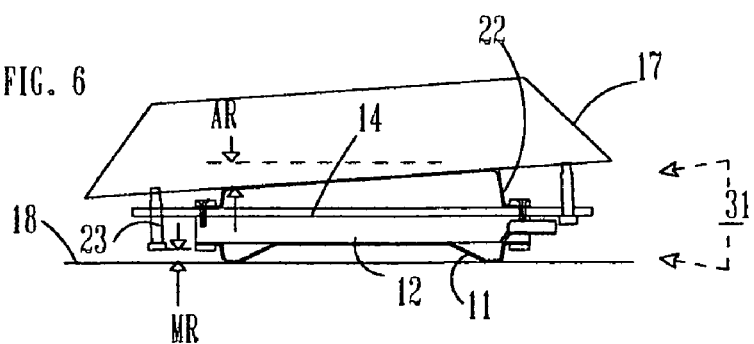

FLUID LEVITATING CASTER INTEGRATING LOAD LIFTING DEVICE

BACKGROUND—FIELD OF THE INVENTION

This invention "fluid levitating caster integrating load lifting device" applies to the industry concerned with transporting heavy loads from place to place about a floor in an industry where loads levitate upon pressurized fluid casters during transport. More particularly, this invention integrates a fluid levitating caster with a load lifting device to extend fluid caster usefulness to transporting loads with flexible-sagging frames over un-flat floors.

BACKGROUND—DESCRIPTION OF PRIOR ART

In the fluid caster industry of my invention, a load is levitated upon multiple fluid casters attached beneath the load. Fluid casters accomplish the levitation or load lift from fluid pressure confined within a plenum volume beneath the casters. Plenum volume is constrained by the floor upon which the load is moving and the wall of a hollow flexible membrane of the fluid caster.

Most fluid casters used today utilize membranes of such design shape that the footprint area near floor contact is a circle. With these designs, each caster will then lift or levitate a weight equal to the circular area (in square inches for example) multiplied by the plenum fluid pressure (in pounds per square inch for this example).

The levitation or rise height of the load is determined by the designed shape of the caster and particularly the caster membrane. Manufacturers try to design casters with the maximum lift possible for reasons which will soon become apparent. Typically, this lift height is about ⅜ inch for smaller casters 8 inches in diameter and increases to about ¾ inch for larger casters 24 inches in diameter.

This relatively low rise height of ⅜ inch to ¾ inch can be problematic. Several conditions can occur in air bearing transport applications where these low rise heights are insufficient:

Difficulty Flexible-Sagging Load

One example of insufficient caster rise height would be an application where the machine to be moved is large and is flexible. Consider a 6,000 pound machine 10 foot square in size, constructed on a frame fabricated from thin gauge square tubes, normally resting on four legs. If one were to place four air bearings with a rise height of ⅜ inch at four places strategically placed under this machine frame, the casters when inflated will all rise ⅜ inch, but the machine frame may be so compliant (bendable) as to only allow the frame tubing in close proximity above the casters to lift the ⅜ inch. However, the machine frame at locations further away from the casters may not lift at all or very little. One or more machine legs may remain resting on the floor when the casters inflate. If the operator tried to move the machine as described, the dragging leg or legs could damage the machine or floor, or cause enough friction as to not allow the machine to move at all!

Difficulty Un-flat Floor

Another example of insufficient caster rise height would be where the floor is undulated (un-flat) and includes pockets of recessed areas or raised areas that exceed the caster rise heights within an area about the same size as the caster. Visualize another machine again with a very rigid frame resting normally on four legs. Assume four air bearings with a rise height of ⅜ inch are placed strategically under the machine frame. Consider that the floor over which the machine is to be moved has a depression or pocket of size about equal to the caster size and about ½ inch deep. If the operator were to try to move the machine over this depression, one of the casters would lower into the ½ inch depression, the machine over that caster would also lower ½ inch, and one or more machine legs would drag on the floor and cause damage or stop the move!

Difficulty Caster Tilting

A third example of insufficient caster rise height would be combination of the previous two scenarios and involves caster tilting. Conditions of floor flatness and machine frame bending can combine to cause non-parallel-ness between the local floor area (where the caster traverses) and the sagging frame structure to which the caster is attached. If this condition occurs, the caster membrane can be tilted or tipped from one side to the other exceeding the rise height capability of the caster. If this occurs, the membrane can not seal with the floor and the caster will not levitate. It happens, that manufacturers design caster lift heights relative to membrane diameters such that casters must be positioned parallel to the local floor within 2½ degrees for the caster to be able to seal with the floor. This 2½ degree limit can be exceeded by combinations of local machine frame bending and local floor undulation.

It is an object of my invention to integrate the fluid levitating caster with a high rise load lifting device so that the caster functionality problems described above are solved. This high rise caster integration of my invention can have a machine or load lifting capability of several times the ⅜ and ¾ inch membrane lifting heights described. With my invention, practical machine lifting heights exceeding 3 inches for the caster diameters of 8" to 24" are quite practical. With my invention "fluid levitating caster integrating load lifting device", the common operational problems associated with machine frame flexure/bending, undulating floors, and non parallel caster mounting between the floor and load disappear!

Numerous inventors have patented various configurations of fluid levitating casters from about the 1960's and on. However, none of these patents mention the inclusion of a high lift device to add lift beyond the membrane lift height. U.S. Pat. No. 3,756,342 by Burdick, Sep. 15, 1971 shows a very representative fluid caster patent. FIG. 3 shows a (levitation membrane) diaphragm 15 in contact (or near contact) with a floor 12. The same view also shows a fluid caster platform 10 raised or levitated off floor 12 by an amount equal to diaphragm 15 lift (as caused by automobile inner tube like air inflation). In this patent (as all others in this industry), it is clear that no structure element exists to raise caster platform 10 an amount exceeding diaphragm 15 lift.

Prior Art Method to Achieve High Load Lift

Prior to my invention, if an air caster operator wanted to lift a load higher than the caster membrane lift height (to compensate for load frame flexure, uneven floors, etc.); they would attach an independent load lifting device between each caster mounting plate and the load frame.

A typical example of such a device would be an independent air bag.

Air bags used are smaller in diameter than the caster and so must operate at a greater fluid pressure to lift the same load as the caster beneath. A typical application might use an 8 inch diameter caster operating at 25 pounds per square inch, and an air bag above the caster of 4 inches in diameter. The air bag would have to operate at 100 pounds per square inch pressure to lift the same load as the caster. The dual pressure requirements increases the system complexity significantly.

For one thing, each caster/air bag unit must include two supply hoses.

For another complexity, the air bag can't just rest on top of the caster. Instead, it must be secured to either the load frame above or the caster frame below. The securing design or method will be complex as it must allow flexible vertical motion between the load and the caster, yet constrain the caster center to the center of the load area above. Additionally, the air bag securing method must not add appreciable collapsed height to the caster as it may no longer fit under the load space.

As a final complexity, the caster control console with pressure gauges, valves, regulators, quick connects, etc. (needed to operate the caster/air bag system) is nearly double in complexity over that required for my invention. The system operators have to contend with a larger control console to move around and to manipulate. The purchaser of the relatively awkward caster/air bag system will have to pay significantly extra for the transport system over that of my invention.

SUMMARY OF THE INVENTION

General

My invention integrates a fluid caster with a load lifting device into a single assembly. This invention results in a unique device that not only efficiently levitates with near-friction-less-ness a heavy load for transporting, but can also lift the load a height off the floor far exceeding the rise height of prior art fluid casters alone. The word "caster" will be used to mean "fluid caster" to simplify hereafter discussions.

Loads to be levitated for moving usually rest on four legs contacting the floor—legs cumulatively support the load weight. Four casters are usually placed under the load somewhere near the legs, so as they inflate, the load legs lift off the floor for transport on casters. It is advantageous for casters to lift the load above the floor as far as is possible as some flexible loads can have at least one load leg remaining or dragging on the floor even after prior art casters are inflated.

Multiple conditions can occur when a load leg is not lifted off the floor when prior art casters inflate:
  One condition is when the load frame is so compliant as to sag an amount more than the prior art caster rise height.
  Another condition is when the local floor area over which a prior art caster is moving includes a concave or convex area (about the same size as the caster area) and of a depth or height exceeding the prior art caster rise height.
  Another condition is when prior art casters are mounted between local load attachment areas and local floor traverse areas at a bias angle exceeding that possible by prior art caster rise heights (about 2½ degrees for commercially available prior art casters).

The high rise feature of my invention "fluid levitating caster integrating load lifting device" can transport loads normally experiencing the above problematic conditions.

A load can have four of my inventions positioned beneath it so as they are pressurized (levitated) the load rises a greater height above the floor then possible with prior art casters. The load lifts all four resting legs off the floor and assumes a position to be transported.

With my invention, a smaller contribution to the load rise height is the rise of the caster membranes. The larger contribution to the load rise height is the rise of the load lifting device on top of the fluid caster. The load lifting device of my invention pushes upward against the bottom of the load, and so raises the load an additional amount.

Bellows Load Lifting Device

One practical design shape of the load lifting device of my invention is a round pie pan shaped flexible bellows held in place on top of the fluid caster frame plate by a clamping ring sealing the bellows lip so as to form a fluid leak proof bellows type chamber. As the bellows load lifting device inflates, it pushes up on the base of the load, and lifts it an amount that is far greater than possible with caster membrane lift alone. The word "bellows" will be used to mean "bellows load lifting device" to simplify hereafter discussions.

The bellows designed lifting area should be made only slightly larger than the caster membrane area so that it can operate at the identical pressure of the caster membrane and still lift the same load as the caster. With this design, the bellows does not require a separate hose, controls, or pressure supply. The bellows can simply be inflated via a conduit or pressure port from the caster membrane plenum. A port passageway through the caster frame plate conveying pressure from the caster membrane plenum to the inside of the bellows will insure that the bellows inflates whenever the caster membrane inflates. Note, if the bellows area were smaller than the membrane footprint area, than the load would rise only the amount of caster membrane lift, but not receive the added rise from the bellows; as the bellows could not exert enough force to lift the load.

Of course, my invention design must include some vertical limit constraining hardware between the bottom load surface and the caster frame plate to keep the load lift operating in the proper range. This vertical constraining hardware must also act as a lateral positioner of the caster frame plate with respect to the load. With proper constraining hardware, my invention will allow the rise height of the load to vary from a rest zero position to a full rise extent possible by the constrained bellows.

Constraining Hardware Shoulder Screws

This constraining hardware can simply comprise four shoulder screws thread anchored into the bottom of the load, but slideable with regard to the caster frame plate. The bottom of the load can then move vertically with respect to the caster frame plate if the corresponding caster frame plate holes are larger than the screw shoulder diameters. This shoulder screw design also constrains the caster frame plate laterally to the load, as the shoulder screws are guiding within the caster frame plate holes. With properly selected shoulder screw lengths/diameters and corresponding caster frame plate hole diameters:
  My invention can allow the load to move up and down freely as it is inflated and uninflated to a maximum design height that is far greater than the prior art caster membrane lifting capability.

My invention can allow the load to tilt an angle far exceeding 2½ degrees with respect to the floor—2½ degrees being the design limit of commercial prior art casters.

Constraining Hardware—Mounting Plate and Brackets

Another constraining hardware configuration is to add an additional mounting plate above the caster frame plate so that the bellows is sandwiched between the two plates. Brackets can be securely attached to the new mounting plate, but vertically slideable relative to the caster frame plate to the design limits of the bracket. These brackets can slide along the caster frame plate so the caster frame plate is confined laterally. With properly selected bracket design shape/positioning on the mounting plate:

My invention can allow the load to move up and down freely as it is inflated and uninflated to a maximum design height that is far greater than the prior art caster membrane lifting capability.

My invention can allow the load to tilt an angle far exceeding 2½ degrees with respect to the floor.

The bellows was discussed only as one example of many possible load lifting devices that maybe integrated with the caster. A second example would be a pressure fluid bag such as that used by emergency rescue teams. The fluid bag can be mounted between the caster body/frame/plate and the load (or another mounting plate which in turn can attach to the load).

My invention vertical motion limit and horizontal constraining hardware discussed above as shoulder screws in one example and formed brackets in another example are not the only hardware devices possible. These were discussed to provide two design methods to provide understanding of achieving free vertical motion of the load above the caster to a limit, while preventing lateral motion of the caster body. Many other design hardware methods can accomplish same: including telescoping tubes, pins siding within slots, and flexible webbing straps to name but only three more.

The important invention objective is to integrate with a prior art fluid caster a practical vertical load lifting device that can lift the load to a far greater height than prior art fluid caster membranes can alone.

My invention "fluid levitating caster integrating load liffing device" is not appreciably larger in physical size, nor in weight, nor in cost than that of prior art fluid casters alone. Therefore cost and space advantages can be realized over alternative methods required when high load lifting is required over non flat floors, with loads having bendable frames, or when casters are mounted non-parallel to the load.

The original problem my invention was attempting to solve was to add increased load lift to prior art casters with low cost, and low uninflated thickness so it can be positioned under loads resting only a nominal distance above the floor.

Unexpected Angular Operational Benefit

However during my invention development, two unexpected advantages were realized: First, it was learned the invention became useful in situations where the caster is angled relative to the load (or where the floor slopes are at an angle relative to the load). In these situations, if this angle exceeded about 2½ degrees, prior art casters would not operate/inflate. However, my invention hardware designs between the load and the caster frame plate allow the caster to tilt relative to the load at an angle far exceeding the here-to-fore 2½ degree practical limit. This angular operating feature/benefit of my invention opens to the industry the fluid levitated transport of loads using casters in situations not possible with prior art casters.

Unexpected Dampening Benefit

The second unexpected advantage of my invention is that the bellows chamber in direct pressure communication with the caster levitation chamber provides a most effective vibration or hopping damping correction to the caster. This unstable hopping characteristic of fluid casters is well understood by caster designers, and so, is the solution of adding the largest possible fluid reservoir in pressure communication with the caster levitation chamber. The high lift device of my invention "fluid levitating caster integrating load lifting device" includes just such a bellows chamber reservoir and unexpectedly solves the hopping problem inherent in fluid casters without having to add an external costly, and space consuming reservoir.

The prior art U.S. Pat. No. 3,756,342 by Burdick, Sep. 15, 1971 identifies this prior art solution to the inherent caster hopping problem. This Burdick U.S. Pat. No. 3,756,342 patent at about line 48 of column 2 of the specification refers to a dampening chamber 32 in pressure connection with the caster annular zone 25 through a damping opening 36. Damping chamber 32 purpose is described as serving to dampen or smooth out surges in air pressure within caster annular zone 25.

The bellows or similar pressure chambered high rise device of my invention "fluid levitating caster integrating load lifting device" serves the exact same damping function of the Burdick U.S. Pat. No. 3,756,342 damping chamber 32.

By way of example, my invention is illustrated herein by the accompanying drawings, wherein:

DRAWING FIGURES

In the drawings, closely related components from different figure assemblies have the same number but different alphabetic suffixes.

FIG. 3 is a perspective view of a fluid levitating caster integrated with a load lifting device—where lift device vertical motion is constrained by shoulder screws.

FIG. 4 shows a sectional elevation view taken as suggested by lines 4—4 of FIG. 3 shown placed between floor and load to be levitated and moved—where caster is shown inflated.

FIG. 5 shows a sectional elevation view of the assembly of FIG. 4—where caster is shown uninflated.

FIG. 6 shows a sectional elevation view of the assembly of FIG. 4—where caster is shown inflated and floor is not parallel to the load.

REFERENCE NUMERALS IN DRAWINGS

Figure 1:
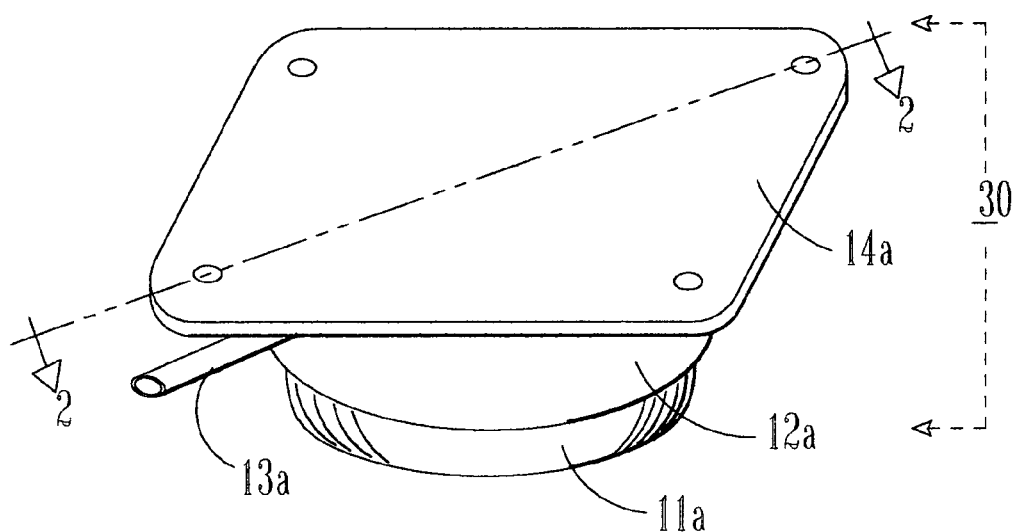
FIG. 1 is a perspective view of a prior art fluid caster

11 & 11a membrane
12 & 12a caster body
13 & 13a conduit
14 & 14a caster plate
15 & 15a plenum
16 mounting plate
17 load
18 floor
19 clamp ring
20 ring screw
21 bellows port
22 bellows
23 & 23a mounting shoulder screws
24 positioning brackets
25 bracket screws
26 mounting holes
27 & 27a levitation chamber
28 webbing straps
29 matching holes
30 assembly
31 invention A
32 invention B
33 invention C
MR membrane rise height
ER extra rise height
AR angular tilt

DESCRIPTION OF THE PREFERRED EMBODIMENTS

1. Description of a Prior Art Embodiment

Figure 2:
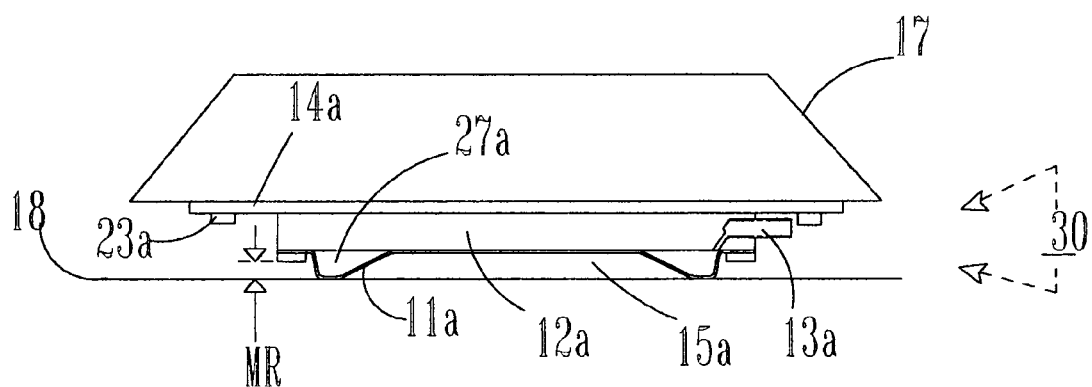
FIG. 2 shows a fragmentary sectional elevation view of FIG. 1 taken as suggested by lines 2—2 shown placed between a floor and load to be levitated and moved.

The view of FIG. 1 shows a prior art fluid caster construction referred to as an assembly 30. Components of assembly 30 will be referred to as the same numbers with an "a" suffix as components later used in my invention descriptions to help comparative understanding. Assembly 30 includes a caster body 12a, a levitation membrane 11a, a mounting caster plate 14a, and a pressure inlet conduit 13a. Referring now to the view of FIG. 2, assembly 30 is shown resting on the surface of a floor 18. Positioned above assembly 30 is a load 17 to be levitated and moved. Load 17 is shown fastened to caster plate 14a with mounting shoulder screws 23a. Assembly 30 is shown inflated in that load 17 rises a height above floor 18 an amount referred to as a membrane rise height MR. Levitation is accomplished whenever pressurized fluid is conveyed into conduit 13a, which pressurizes a sealed levitation chamber 27a above membrane 11a and within a membrane plenum 15a. Note the total load 17 lift is only that distance provided by membrane 11a inflation—membrane rise height MR.

2. The Invention A Embodiment With Bellows High Lift and Shoulder Screw Attachment to Load The view of FIG. 3 shows an embodiment of my invention "fluid levitating caster integrating load lifting device" referred to as an invention A 31. Invention A 31 includes a caster body 12, a levitation membrane 11, a mounting caster plate 14, and a pressure inlet conduit 13.

Referring now to the view of FIG. 4, invention A 31 is shown resting on surface of floor 18. Positioned above invention A 31 is load 17 to be levitated and moved. Load 17 is shown fastened to caster plate 14 with a series of long mounting shoulder screws 23. Invention A 31 is shown inflated in that caster body 12 rises a height above floor 18 an amount equal to membrane rise height MR. Levitation is accomplished whenever pressurized fluid is conveyed into conduit 13, which pressurizes a levitation chamber 27 above membrane 11 and within plenum 15. So far invention A 31 is nearly identical in design and function to prior art caster assembly 30 of FIG. 1.

Mounting plate 16 thickness found to work well to attach with high rise lifting bellows 22 is ¼ inch and made from a stiffer aluminum alloy such as 6061 T6. However, thicker plates should work as well as or better to the limit of fitting under the load space available.

However, attached to the top of invention A 31 are additional extra lifting components: These include a pie plate shaped bellows 22, with a clamp ring 19 and an annular series of ring screws 20. Ring screws 20 and clamp ring 19 seal bellows 22 with the top surface of caster plate 14 so bellows 22 confines an inflatable chamber within. Included in invention A 31 is a bellows port 21 which conveys pressurized fluid from a caster levitation chamber 27 to bellows 22. In this manner, whenever caster membrane 11 is pressurized, bellows 22 is also pressurized.

The area of bellows 22 in contact with load 17 is designed to be slightly larger than the contact area of membrane 11 with floor 18. This area selection insures that when enough pressure is applied within membrane 11 to levitate load 17, bellows 22 will also lift load an extra height referred as an extra rise height ER.

A flexible thin material that has been found to work well for fabricating bellows 22 is polyurethane reinforced with cotton cloth weave. An effective hardness for the polyurethane can be 65 shore A, as it is flexible enough to seal well under clamp ring 19 and ring screws 20. A good material thickness is 0.05 inches. Bellows 22 lip width to affect a leak proof seal is around ⅝ inch. The molding can be easily performed by most commercial rubber molding houses such as Advanced Urethane Solutions, 3912 Tryon Courthouse Road, Cherryville, N.C. 28021.

Mounting shoulder screws 23 slip within caster plate 14, and thread within the bottom of load 17. In this way, mounting shoulder screws 23 allow bellows 22 to lift load 17 vertically while constraining laterally to extra rise height ER limit as determined by the shoulder length of mounting shoulder screws 23.

Shoulder screws 23 used in the first constraining mount configuration are well known fasteners by machinists and machine designers. It has been found that 5/16 inch shoulder diameter provides good strength for lateral caster plate 14 guidance. They can be purchased from catalog sales from McMaster Carr Supply Company of Dayton, N.J. 08810.

Note the total load 17 lift is the sum of membrane rise height MR plus extra rise height ER. Load 17, with invention A 31, can be lifted to far greater heights above floor 18 (easily several times membrane rise height MR of prior art caster assembly 30 of FIG. 1).

Invention A 31 is shown in FIG. 5 uninflated. Membrane 11 is collapsed against floor 18 and there is no membrane rise height MR. High lift bellows 22 is collapsed between load 17 and caster plate 14, with load 17 resting upon clamp ring 19. Mounting shoulder screws 23 are shown slipped to their fullest extent toward floor 18.

Invention A 31 is shown in FIG. 6 with an angular tilt AR separation shown between load 17 and caster body 12. The angularity is possible simply by using enlarged holes through caster plate 14 through which slide mounting shoulder screws 23. Note angular tilt AR magnitude is greater than maximum possible membrane rise height MR With invention A 31, load 17 can be tilted with respect to local floor 18 area to a far greater amount than is possible with prior art caster assembly 30 of FIG. 1.

Figure 7:
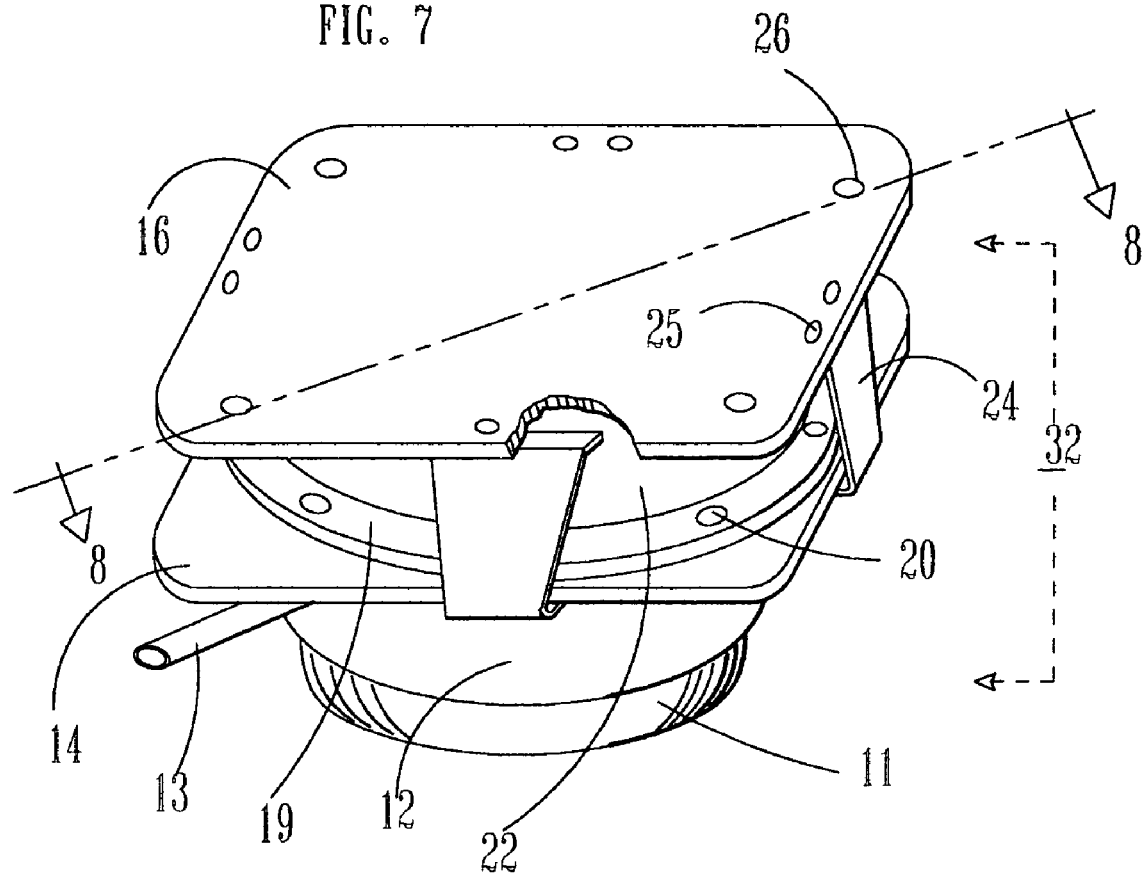
FIG. 7 shows another embodiment of a fluid levitating caster integrated with a load lifting device—where lift device vertical motion is constrained by slideable brackets.

3. The Invention B Embodiment With Bellows High Lift and Bracket With Mounting Plate Attachment to Load The view of FIG. 7 shows an embodiment of my invention "fluid levitating caster integrating load liffing device" referred to as an invention B 32. Invention B 32 includes caster body 12, levitation membrane 11, caster plate 14, and pressure inlet conduit 13. Invention B 32 includes an extra mounting plate 16 above bellows 22. Mounting plate 16 has attached to its periphery a series of positioning brackets 24 secured with a series of bracket screws 25 rigidly securing positioning brackets 24 and threaded into mounting plate 16. Positioning brackets 24 are positioned and shaped so that they allow vertical travel between caster plate 14 and mounting plate 16 as bellows 22 lifts and contracts. Yet positioning brackets 24 constrain lateral motion between mounting plate 16 and caster plate 14. Note further that the design and location of positioning brackets 24 with respect to caster plate 14 will allow angular tilt AR similar to that shown in FIG. 6.

Brackets 24 used in the second constraining mount configuration can be made of a formed steel alloys, with a thickness exceeding about 0.10 inch, and a width exceeding about 1 inch. These approximate minimum sizes provide good lateral caster plate 14 guidance.

Figure 8:
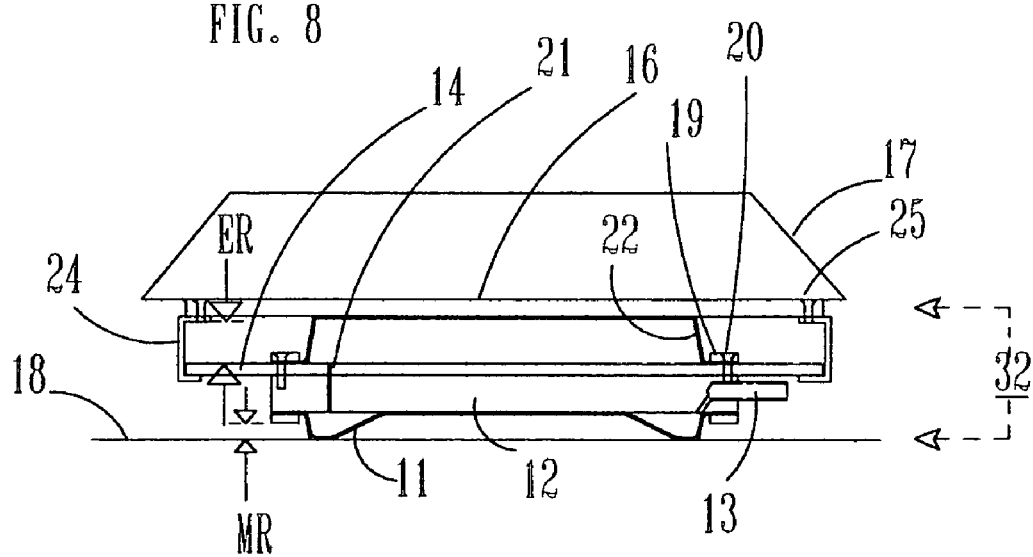
FIG. 8 shows a sectional elevation view taken as suggested by lines 8—8 of FIG. 7 shown placed between floor and load to be levitated and moved

Referring to the view of FIG. 8, caster invention B 32 is shown resting on surface of floor 18. Positioned above invention B 32 attached to mounting plate 16 with screws (not shown) through a series of mounting holes 26 (shown in FIG. 7) is load 17 to be levitated and moved. As with invention A 31 of FIGS. 3–6, attached to the top of invention B 32 are the extra lifting components: bellows 22, clamp ring 19 ring screws 20. Invention B 32 is shown levitated in that load 17 rises a height above floor 18 an amount equal to membrane rise height MR plus extra rise height ER.

Figure 9:
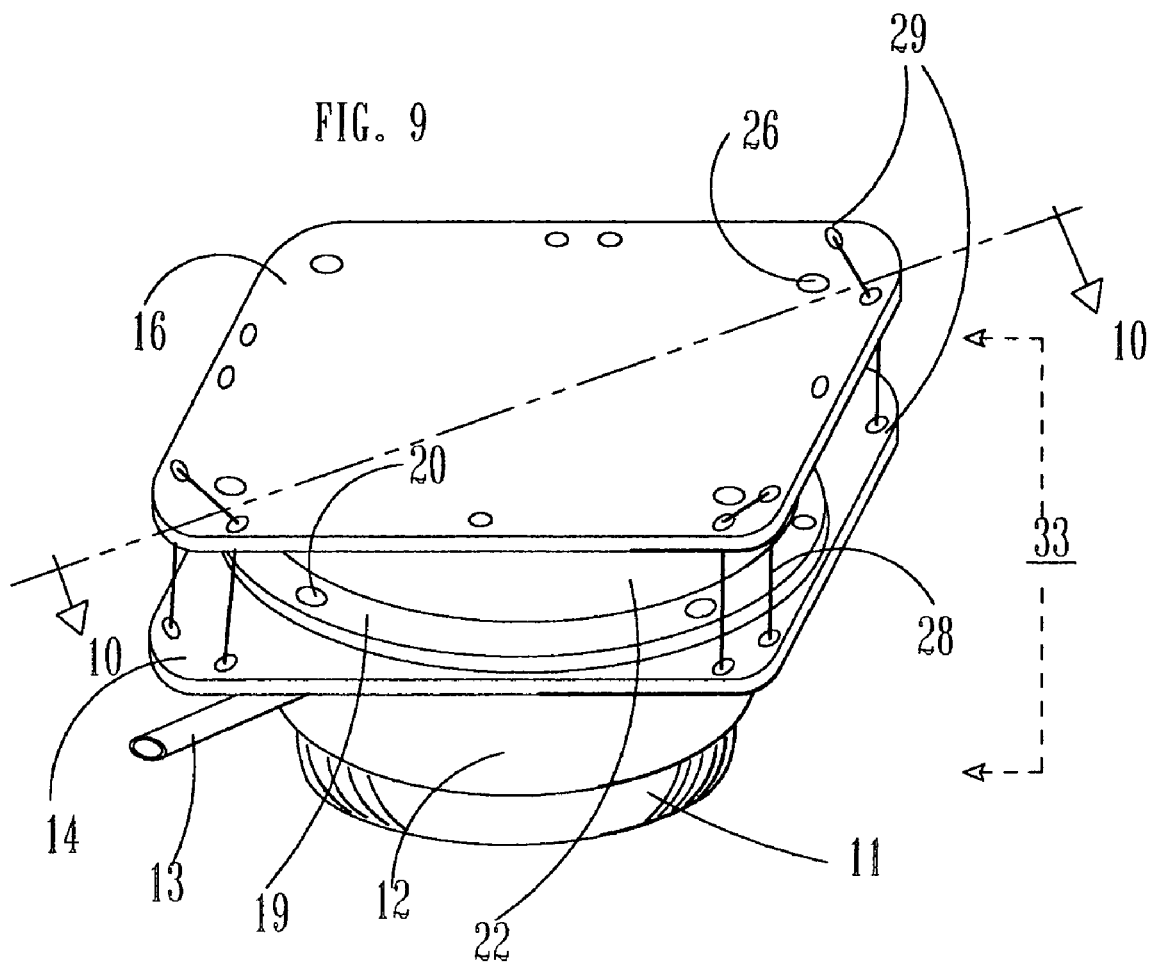
FIG. 9 shows another embodiment of a fluid levitating caster integrated with a load lifting device—where lift device vertical motion is constrained by webbing straps.

4. The Invention C Embodiment With Bellows High Lift and Webbing Strans With Mounting Plate Attachment to Load The view of FIG. 9 shows an embodiment of applicant's invention "fluid levitating caster integrating load lifting device" referred to as an invention C 33. Invention C 33 includes caster body 12, levitation membrane 11, caster plate 14, and pressure inlet conduit 13. Invention C 33 includes an extra mounting plate 16 above bellows 22. Mounting plate 16 has attached to its periphery a series of webbing straps 28 shown in this example laced through matching holes 29 in both mounting plate 16 and caster plate 14. Webbing strap 28 length is selected so they allow desired vertical travel between caster plate 14 and mounting plate 16 as the bellows 22 lifts and contracts. Yet webbing strans 28 constrain excessive lateral motion between mounting plate 16 and caster plate 14. Note further that the design and location of webbing straps 28 with respect to caster plate 14 will facilitate angular tilt AR similar to that shown in FIG. 6.

Webbing Straps 28 used in this constraining mount configuration can be made of flexible/bendable braided steel wires strong enough to withstand the maximum bellows 22 lift force possible. Alternately, polyester flexible multistrand cord or woven fabric again strona enough to withstand the maximum bellows 22 lift force possible can be used for constructing webbing straps 28. The two loose ends of the webbing straps 28 can be secured to the mounting plate 16 with screws (not shown). McMaster Carr Company at 473 Ridge Road. Dayton, N.J. 08810 offers a wide selection of steel braided, multi-strand cord, and fabrics both strong enough and flexible enough for this application.

Figure 10:
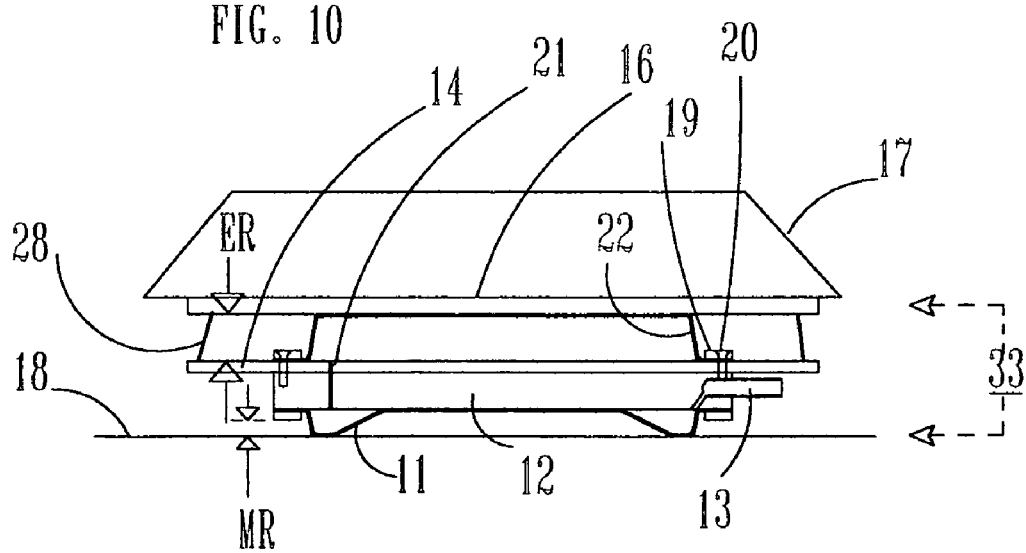
FIG. 10 shows a sectional elevation view taken as suggested by lines 10—10 of FIG. 9 shown placed between floor and load to be levitated and moved.

Referring to the view of FIG. 10, invention C 33 is shown resting on surface of floor 18. Laced through mounting plate 16 positioned above invention C 33 are shown multiple webbing straps 28. Correspondingly, same webbing straps 28 are shown laced through caster plate 14. Shown above the mounting plate 16 is load 17 to be levitated and moved. As with invention A 31 of FIGS. 3–6, attached to the top of invention C 33 are the extra lifting components: bellows 22, clamp ring 19, ring screws 20. Invention C 33 is shown levitated in that load 17 rises a height above floor 18 an amount equal to membrane rise height MR plus extra rise height ER.

The invention claimed is:

1. A pressurizable fluid caster device for translating a load with high lift properties comprising:
   a pressurizable fluid caster body having a lower end and an opposite upper end;
   a levitation means formed at said lower end of said fluid caster body, said levitation means including a levitation chamber providing levitation support for said load above a bottom surface;
   a pressurizable lifting means disposed at said upper end of said fluid caster body, said pressurizable lifting means includes a pressure chamber expandable above said fluid caster body for high lift operation of said pressurizable fluid caster device;
   a fluid conduit means connects said levitation chamber of said levitation means with said pressure chamber of said pressurizable lifting means, wherein said pressurizable lifting means is vertically slidably attached to said fluid caster body with a plurality of coupling means allowing angular tilt between said fluid caster body and said pressurizable lifting means.

2. The pressurizable fluid caster device according to claim 1, wherein said pressurizable lifting means is vertically slidably attached to said fluid caster body with a plurality of brackets allowing angularity between said fluid caster body and said pressurizable lifting means.

3. The pressurizable fluid caster device according to claim 1, wherein said pressurizable lifting means is vertically slidably attached to said fluid caster body with a plurality of flexibly webbing straps allowing angularity between said fluid caster body and said pressurizable lifting means.

4. The pressurizable fluid caster device according to claim 1, wherein said pressurizable lifting means is constructed of formed flexible thin material.

* * * * *